United States Patent [19]

Chang et al.

[11] Patent Number: 4,532,844

[45] Date of Patent: Aug. 6, 1985

[54] DEVICE FOR SUPPORTING A CIRCULAR SAW OF SAWING MACHINE

[76] Inventors: Jen W. Chang; Hong-Tswen Chang, both of No. 68, Chung Cheng Rd., Fong Yuan City, Taichung Hsien, Taiwan

[21] Appl. No.: 600,262

[22] Filed: Apr. 13, 1984

[30] Foreign Application Priority Data

Sep. 16, 1983 [TW] Taiwan ................. 7226359

[51] Int. Cl.³ ............................ B27B 5/24; B27B 5/30
[52] U.S. Cl. .................. 83/477.1; 83/477.2; 83/700; 474/112
[58] Field of Search ............... 83/477.1, 477.2, 508.2, 83/700, 699; 474/112

[56] References Cited

U.S. PATENT DOCUMENTS

| 2,344,502 | 3/1944 | Boice | 83/477.1 |
| 2,427,470 | 9/1947 | Morton et al. | 474/112 |
| 2,505,958 | 5/1950 | Grierson | 474/112 X |
| 2,956,595 | 10/1960 | Warrick et al. | 83/477.1 X |
| 4,184,394 | 1/1980 | Gjerde | 83/477.1 |
| 4,276,799 | 7/1981 | Muehling | 83/477.1 X |

Primary Examiner—Frank T. Yost
Attorney, Agent, or Firm—Sughrue, Mion, Zinn, Macpeak and Seas

[57] ABSTRACT

In a wood circular sawing machine, a support for the circular saw which includes a rotary eccentric member mounted for rotation on a horizontal shaft which is in alignment with the axis of the output shaft of the motor, and a body which has its upper portion being mounted with the arbor of the circular saw and is provided with at its lower portion a hollow cylindrical member sleeved onto the eccentric member, wherein the body that supports the arbor can change the distance of the arbor from the axis of the output shaft of the motor by rotating the eccentric member.

2 Claims, 5 Drawing Figures

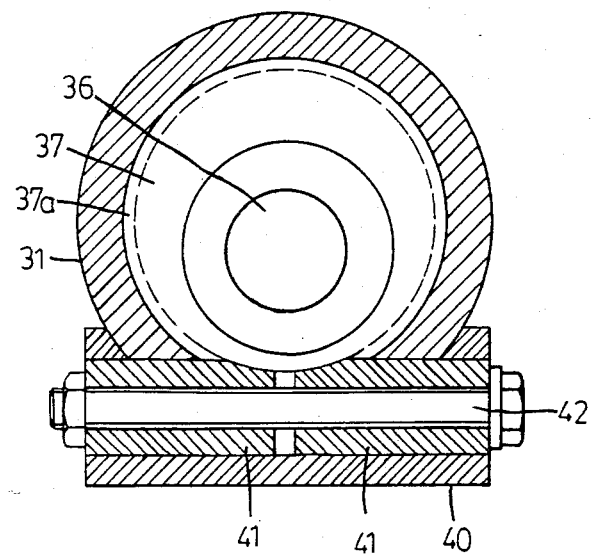
F I G. 3

DEVICE FOR SUPPORTING A CIRCULAR SAW OF SAWING MACHINE

BACKGROUND OF THE INVENTION

This invention relates to a device used in a wood sawing machine for supporting a circular saw that works below the work, particularly to a supporting device which can raise or lower the circular saw corresponding to the requirements for operating different workpieces and regulate the tension of a transmission belt that transmits power from a motor to the circular saw.

Various forms of circular sawing machines have existed in the arts. In some circular sawing machines, the circular saws are mounted to the lower arbors which can be raised or lowered to adjust the positions of the circular saws for matching the operations for various works. In a typical circular sawing machine which is shown in FIGS. 1a and 1b, a circular saw 10 is mounted on a lower arbor disposed in a sleeve 11 which is mounted on a support 12 having its arms 12a and 12b pivoted, about horizontal pivot axes 13c, to two brackets 13a and 13b. The horizontal portion of the support 12 is connected to a hydraulic piston rod 16 and the circular saw 10 is driven by a motor 15 through a transmission belt 14. The circular saw 10 can be adjusted in its height relative to the worktable by the action of the piston rod 16 which causes the support 12 to turn about the horizontal pivot axes 13c. However, such a machine has a disadvantage in that, when the tension of the transmission belt 14 is required to be adjusted, the position of the motor 15 must be changed in the direction as shown by arrow A. As the motor's position is changed, the axis of the rotation of the support 12 and the axis of the power output shaft can not be in an alignment. This results in that the angular displacement of the support 12 about the pivot axes 13c for adjusting the position of the circular saw 10 undesirably affects the tension of the belt, ie, the tension of the belt may be exceedingly high or low. If the axes of the motor and the arbor are not made parallel after changing the position of the motor, it will result in an improper alignment of the belt and pulleys which may cause the operation of the circular saw imperfect.

SUMMARY OF THE INVENTION

An object of the invention is to provide a device for mounting the circular saw which can adjust the tension of the belt without changing the position of the motor, thereby eliminating the above described disadvantages.

The foregoing and other objects can be achieved in accordance with the present invention through the provision of a circular sawing machine of the type having a circular saw mounted on an arbor below a worktable for rotation about a first horizontal axis and a motor for driving the arbor having a driving pulley mounted on its horizontal output shaft and a transmission belt passing over said driving pulley. The machine includes a device for supporting the circular saw which comprises: a rotary eccentric member rotatably mounted on a second axis which is in alignment with the axis of the output shaft of the motor; a body having means for mounting the arbor at its upper portion, a driven pulley mounted on the arbor and connected to the driving pulley through the transmission belt, and a hollow cylindrical member at its lower portion, the cylindrical member being sleeved onto the rotary eccentric member. A hydraulically operated means is connected to the body for turning it about the second axis so as to raise or lower the circular saw relative to the worktable. A lever means is attached to the eccentric member for rotating it relative to the hollow cylindrical member so as to adjust the distance of the axis of the arbor from the axis of the output shaft. There is further provided a means for releasably locking the eccentric member.

Advantageously, the locking means may include a frictionally restricting means and a tightening screw means for providing the restricting means a friction pressure against the eccentric member.

The presently preferred exemplary embodiment will be described in detail with reference to the following drawings, wherein;

BRIEF DESCRIPTION OF THE DRAWINGS

FIG. 3 illustrates the relation between the eccentric member and the locking means according to the present invention.

DETAILED DESCRIPTION OF THE PREFERRED EMBODIMENT

Figure 1A:
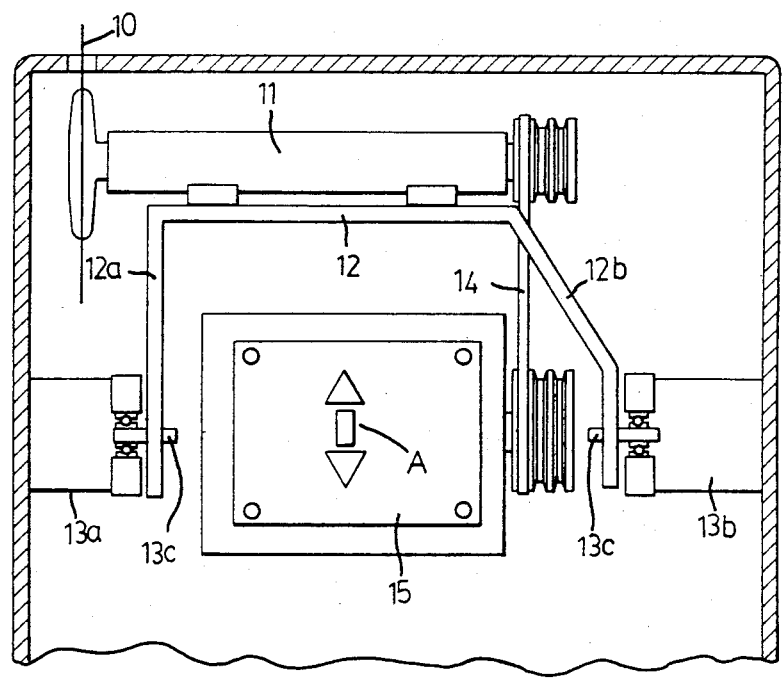
FIGS. 1a and 1b illustrate a support device for a circular saw of a wood working machine in the prior art.
Figure 1B:
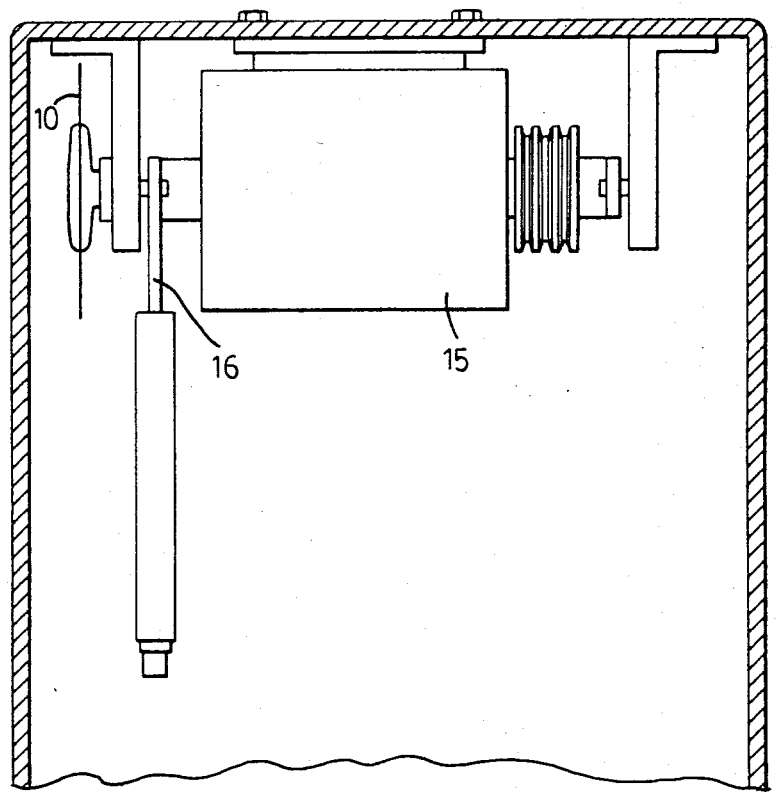
Figure 2:
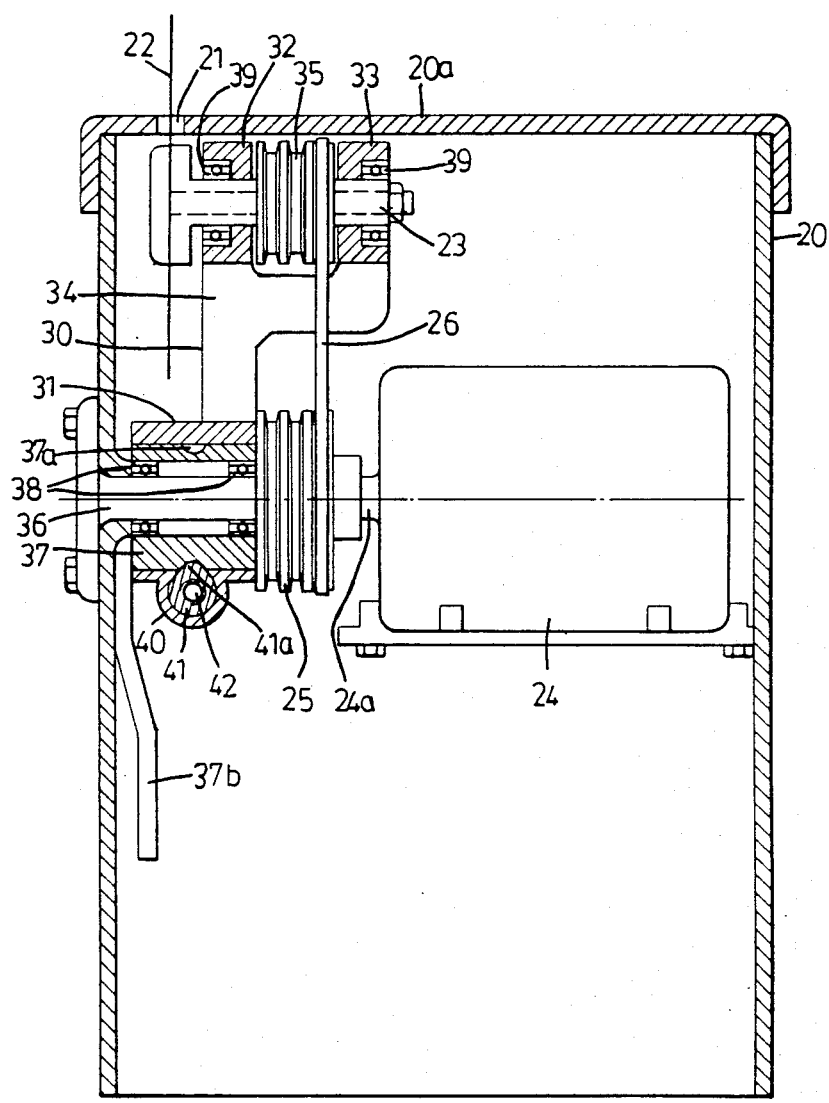
FIG. 2 is a partially sectioned view illustrating a support device for a circular saw of a wood working machine in accordance with the present invention.

Referring to the drawings, there is shown a frame 20 of a circular sawing machine for handling wood. The top side 20a of the frame 20 serves as a worktable and has a groove 21 for receiving an upwardly extending portion of a circular saw 22 which is mounted on an arbor 23 disposed below the worktable 20a. A motor 24 is mounted to the frame 20 at a location lower than the arbor 23 for producing an output rotary movement about a horizontal axis. To the output shaft 24a of the motor is mounted a pulley 25 over which is passed a transmission belt 26.

The arbor 23 of the circular saw 22 is mounted to a support body 30 which includes a lower hollow cylindrical member 31, two upper cylindrical bearing housings 32 and 33 and a web 34 interconnecting the hollow member 31 and the housings 32 and 23. The housings 32 and 33 are spaced apart and between them are provided a pulley 35 which is connected to the driving pulley 25 through the transmission belt 26. The arbor 23 is journaled in bearing members 39 which are provided in the housing 32 and 33 respectively and the pulley 35.

There is further provided a horizontal fixed shaft 36 which is secured to the frame 20 in alignment with the output shaft 24a. A rotary eccentric member 37 is sleeved onto the shaft 36 and between the shaft 36 and the eccentric 37 are provided bearing assemblies 38. The body 30 is mounted by sleeving the hollow member 31 onto the eccentric 37. To the eccentric 37 is attached a lever 37b which is operated manually for rotating the eccentric 37 relative to the hollow member 31. By operating the lever 37b the distance of the arbor 23 can be changed to some extents relative to the location of the axis of the output shaft 24a due to the eccentric 37. There is further provided a means for locking the eccentric 37 against movement relative to the hollow member 31 in a tubular casing 40 which is connected to and communicated with the lower side of the hollow member 31. The casing 40 is stuffed with two resilient tubular friction members 41 which are sleeved onto a tightening screw 42. The friction members 41 are provided with lobes 41a which are extended into an annular groove 37a of the eccentric 37 and abut against the member 37 by means of the pressure of the tightening screw 42 for locking the eccentric 37 against movement. The friction members 41 will release the eccentric member 37 when the screw 42 is loosened.

The support body 30 is further connected to a piston rod of a hydraulic actuator (not shown) at its web 34. As the construction of the hydraulic actuator is similar to that provided in the conventional circular sawing machine, the details thereof are not described herein. By the operation of the piston rod, the support body 30 can be turned about the axis 36 and the circular saw 22 can therefore be raised or lowered relative to the worktable to suit the operations for different works.

Figure 4:
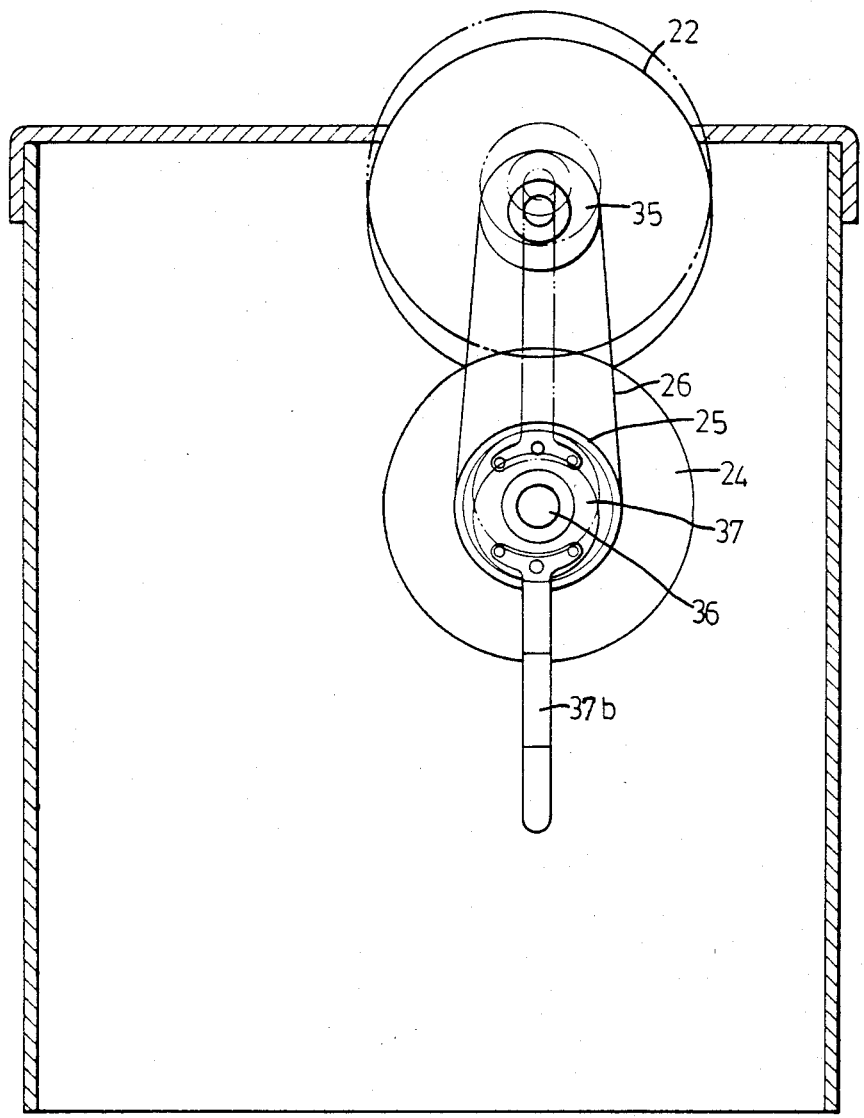
FIG. 4 illustrates the relations between the positions of the circular saw, motor, driving and driven pulleys and the eccentric member before and after adjusting of the belt tension.

When the tension of the belt 26 is required to be adjusted after a period of use, the eccentric member 37 must be released from the restriction of the friction members 41 by loosening the screw 42. Then, the eccentric member 37 is rotated relative to the hollow member 31 by operating the lever 37b. Accordingly, the location of the support body 30 or the arbor 23 is changed to some extents relative to the axis 36 or the axis of the driving pulley 25, as shown in FIG. 4. According to the requirement of achieving a proper tension in the belt 26, the position of the arbor 23 is adjusted by a properly chosen angle of rotation of the eccentric member 37. After the belt's tension is adjusted, the eccentric member 37 must be again locked against movement. The adjustment of the circular saw 22 is done by operating the hydraulic actuator in the same manner as the conventional sawing machine when the tension in the belt is proper. It can be appreciated that, according to the present invention, the tension of the transmission belt for driving the arbor of the circular saw can be adjusted without changing the position of the motor. In addition, the axis of the motor can always be kept in alignment with the axis of the rotation of the support body for circular saw and in a parallel position relative to the arbor of the circular saw, thereby enabling the machine to perform the sawing operation in a perfect manner.

With the invention thus explained, it is apparent that obvious modifications and variations can be made without departing from the scope of the invention. It is therefore intended that the invention be limited only as indicated in the appended claims.

We claim:

1. In a circular sawing machine of the type having a circular saw mounted on an arbor below a worktable for rotation about a first horizontal axis and a motor for driving the arbor having a driving pulley mounted on its horizontal output shaft and a transmission belt passing over said driving pulley, a device for supporting said circular saw comprising: a rotary eccentric member rotatably mounted on a second axis which is in alignment with the axis of the output shaft of said motor; a body having means for mounting said arbor at its upper portion, a driven pulley mounted on said arbor and connected to said driving pulley through said transmission belt, and a hollow cylindrical member at its lower portion and having its axis parallel to said first axis, said cylindrical member being sleeved onto said rotary eccentric member; a hydraulically operated means connected to said body for turning it about said second axis so as to raise or lower said circular saw relative to the worktable; a lever means attached to said eccentric member for rotating it relative to said hollow cylindrical member so as to adjust the distance of the axis of said arbor from the axis of said output shaft; and means for releasably locking said eccentric member.

2. A device supporting the circular saw as claimed in claim 1, wherein said locking means includes a frictionally restricting means and a tighting screw means for providing said restricting means a friction pressure against said eccentric member.

* * * * *